(12) United States Patent
Hartley et al.

(10) Patent No.: US 9,214,822 B2
(45) Date of Patent: Dec. 15, 2015

(54) BATTERY PACK MANAGER UNIT AND METHOD FOR USING SAME TO EXTEND THE LIFE OF A BATTERY PACK

(75) Inventors: Thomas T. Hartley, Mogadore, OH (US); Benjamin W. Magistro, Odenton, MD (US); Courtney A. Gras, Aurora, OH (US); Rick Clester, Tallmadge, OH (US); Andrew Faulstick, Rootstown, OH (US)

(73) Assignee: The University of Akron, Akron, OH (US)

( * ) Notice: Subject to any disclaimer, the term of this patent is extended or adjusted under 35 U.S.C. 154(b) by 570 days.

(21) Appl. No.: 13/263,208

(22) PCT Filed: Apr. 6, 2010

(86) PCT No.: PCT/US2010/030109
§ 371 (c)(1),
(2), (4) Date: Jan. 6, 2012

(87) PCT Pub. No.: WO2010/118039
PCT Pub. Date: Oct. 14, 2010

(65) Prior Publication Data
US 2012/0112685 A1   May 10, 2012

Related U.S. Application Data

(60) Provisional application No. 61/166,892, filed on Apr. 6, 2009.

(51) Int. Cl.
*H02J 7/00* (2006.01)
*B60L 3/00* (2006.01)
*B60L 11/18* (2006.01)

(52) U.S. Cl.
CPC ............. *H02J 7/0047* (2013.01); *B60L 3/0038* (2013.01); *B60L 3/0046* (2013.01); *B60L 11/1861* (2013.01); *B60L 11/1866* (2013.01); *H02J 7/0021* (2013.01); *H02J 7/0022* (2013.01); *B60L 2240/545* (2013.01); *B60L 2240/547* (2013.01); *B60L 2240/549* (2013.01);
(Continued)

(58) Field of Classification Search
CPC ........................... H01M 10/482; H01M 10/441
USPC ........................................ 320/106, 112, 116
See application file for complete search history.

(56) References Cited

U.S. PATENT DOCUMENTS

5,576,611 A * 11/1996 Yoshida ........................ 320/152
5,631,534 A * 5/1997 Lewis ............................ 320/103
(Continued)

*Primary Examiner* — Drew A Dunn
*Assistant Examiner* — Zixuan Zhou
(74) *Attorney, Agent, or Firm* — Renner, Kenner, Greive, Bobak, Taylor & Weber (57) ABSTRACT

The present invention generally relates to a device and method for the management of a collection of battery cells. In one embodiment, the present invention permits the management of a collection of battery cells composed of an overall battery pack manager unit, individual cell manager units, and wireless communication links between these units. In another embodiment, the present invention relates to a device and method for the management of a collection of battery cells in the field of rechargeable batteries, such as batteries based on lithium-based chemistries, nickel-based chemistries, and lead-acid chemistries. In still another embodiment, the present invention is directed to a method that permits the maximization of battery pack capacity during a charge-discharge cycle and/or permits the maximization of the total number of charge-discharge cycles.

20 Claims, 5 Drawing Sheets

(52) U.S. Cl.
CPC ......... *B60L 2260/44* (2013.01); *Y02T 10/7005* (2013.01); *Y02T 10/7011* (2013.01); *Y02T 10/7044* (2013.01); *Y02T 10/7061* (2013.01); *Y02T 90/16* (2013.01)

(56) References Cited

U.S. PATENT DOCUMENTS

| | | | |
|---|---|---|---|
| 5,831,350 A * | 11/1998 | McConkey et al. | 307/150 |
| 5,955,869 A * | 9/1999 | Rathmann | 320/132 |
| 6,031,353 A * | 2/2000 | Banyas et al. | 320/112 |
| 6,118,248 A | 9/2000 | Gartstein et al. | |
| 6,160,382 A | 12/2000 | Yoon et al. | |
| 6,184,656 B1 * | 2/2001 | Karunasiri et al. | 320/119 |
| 6,373,226 B1 | 4/2002 | Itou et al. | |
| 6,577,104 B2 | 6/2003 | Sakakibara | |
| 7,053,588 B2 * | 5/2006 | Nakanishi et al. | 320/104 |
| 7,489,107 B2 | 2/2009 | Hartley et al. | |
| 7,714,736 B2 * | 5/2010 | Gielniak | 340/636.1 |
| 2005/0121979 A1 * | 6/2005 | Matsumoto et al. | 307/66 |
| 2005/0248315 A1 | 11/2005 | Hartley et al. | |
| 2007/0069687 A1 * | 3/2007 | Suzuki | 320/108 |
| 2010/0156343 A1 * | 6/2010 | Jung | 320/108 |

\* cited by examiner

BATTERY PACK MANAGER UNIT AND METHOD FOR USING SAME TO EXTEND THE LIFE OF A BATTERY PACK

RELATED APPLICATION DATA

This patent application claims priority to International Application No. PCT/US2010/030109, filed on Apr. 6, 2010, and U.S. Provisional Patent Application No. 61/166,892, filed on Apr. 6, 2009, the entirety of which is hereby incorporated by reference herein.

FIELD OF THE INVENTION

The present invention generally relates to a device and method for the management of a collection of battery cells. In one embodiment, the present invention permits the management of a collection of battery cells composed of an overall battery pack manager unit, individual cell manager units, and wireless communication links between these units. In another embodiment, the present invention relates to a device and method for the management of a collection of battery cells in the field of rechargeable batteries, such as batteries based on lithium-based chemistries, nickel-based chemistries, and lead-acid chemistries. In still another embodiment, the present invention is directed to a method that permits the maximization of battery pack capacity during a charge-discharge cycle and permits the maximization of the total number of charge-discharge cycles.

BACKGROUND OF THE INVENTION

Portable electronic devices allow users to work and play free of restrictive power cords and chargers for a limited period of time. As people work outside of their traditional office, they often find themselves using their notebook computers, cellular phones, digital assistants and tablet computers. Similarly, people enjoying themselves away from the home take advantage of portable music players, digital cameras, electronic game systems and the like while on travel or doing outdoor activities.

Rechargeable batteries are used for portable electronic devices, such as portable computing systems, video cameras, mobile phones, etc. While users attempt to operate with the freedom of mobile computing, they are still basically tethered to a power cable. As such, the users must think about how much power is available for mobile use and the availability time period. This time period is limited to the type of battery and other factors. Users often carry power cables and AC power adapters with them so they can physically connect to electronic power for recharging when the battery power gets too low. These users must search for electrical plug-in locations that may be in inconvenient places. Furthermore, such power cables potentially create a hazard risk for people who might walk into the power cords. Still at other times, the user may fumble with various types of power connectors for the specific electronic device. Additionally, users often carry supplemental battery packs to replace the depleted energy of the battery. Besides the general inconvenience of carrying additional battery packs, these actions create further problems, including wasting space in cases and increasing the weight load a user must carry. Thus, the mobile computing user still does not receive the freedom of portable computing.

Thus, in one instance, there is needed for a device and method for supporting user interaction in an un-tethered environment for new media technologies and productivity activities of mobile electronic devices. There is also a need for a device and method that can permit wireless management and charging of a collection of battery cells regardless of the type of device in which the battery cells are contained.

SUMMARY OF THE INVENTION

The present invention generally relates to a device and method for the management of a collection of battery cells. In one embodiment, the present invention permits the management of a collection of battery cells composed of an overall battery pack manager unit, individual cell manager units, and wireless communication links between these units. In another embodiment, the present invention relates to a device and method for the management of a collection of battery cells in the field of rechargeable batteries, such as batteries based on lithium-based chemistries, nickel-based chemistries, and lead-acid chemistries. In still another embodiment, the present invention is directed to a method that permits the maximization of battery pack capacity during a charge-discharge cycle and permits the maximization of the total number of charge-discharge cycles.

In one embodiment, the present invention relates to a battery pack manager unit comprising:
  a pack identifier block;
  a pack sensor block that comprises pack current sensors, pack voltage sensors and pack temperature sensors;
  a pack current control block that comprises a block that uses signals from a pack performance coordinator block to control the pack current;
  a pack informational display block that displays one or more of a pack voltage, a pack current, a pack temperature, a pack state-of-charge, a pack state-of-life, a pack state-of-health, or individual cell information, where the individual cell information includes one or more of a cell voltage, a cell current, a cell temperature, cell model parameters, cell damage rates, a cell state-of-charge, a cell state-of-life, a cell state-of-health, cell faults or cell manager unit failures.
  a pack performance coordinator block which has the ability to change the pack charging or discharging current to coordinate with the individual cells so as to achieve specific performance objectives, such as minimizing individual cell damage rates, minimizing charging time, or maximizing the energy out of the pack; the parameters of which are highly dependent on cell chemistry, where pack performance coordinator block comprises:
    a pack current control block;
    a cell-pack-current coordination block, wherein this block coordinates pack charging currents with cell bypass currents;
    a pack performance objective coordinator block;
    a real-time pack capacity estimator block;
    a real-time pack state-of-charge estimator block;
    a real-time pack state-of-life estimator block;
    a real-time pack state-of-health estimator block;
    a real-time charge-exchange coordinator block;
    a communication block;
    a communication failure detection and estimator block that is designed to accommodate and coordinate; and
    a pack fault detection and estimator block in combination with an emergency disconnect block; and
  a wireless communication block including a wireless link with every individual cell manager unit; a wireless link with any load control unit, such as a vehicle controller; a wireless link with any battery charging unit, such as a power supply; and a wireless link with the Internet for remote monitoring.

In another embodiment, the present invention relates to an individual cell manager unit for a battery pack manager unit, where the individual cell manager unit comprises:
- a cell and pack identifier block that is a unit for assigning an identification code to each individual cell manager unit and recognizing the overall battery pack unit identification code;
- a cell sensor block including one or more of cell current sensors, cell voltage sensors, cell temperature sensors, or cell bypass current sensors;
- a cell overvoltage protection block including a pseudo-passive overvoltage protection unit to accommodate failures in the microcontroller block;
- a cell under-voltage protection block having a passive unit to accommodate cell failures and microcontroller block failures during discharge;
- a cell microcontroller block comprising:
  - a performance objective coordinator block;
  - a real-time cell model parameter identification block;
  - a real-time cell capacity estimator block;
  - a real-time cell state observer block for estimating cell dynamic variables;
  - a real-time state-of-charge estimator block;
  - a real-time damage rate sensor block;
  - a real-time state-of-life estimator block;
  - a real-time state-of-health estimator block;
  - a real-time cell fault detection and estimator block;
  - a real-time component failure detection and estimator block;
  - a real-time cell life-extending charging-current-profile shaping block;
  - a communication block;
  - a real-time wireless communication failure detection and estimator block; and
  - a sleep-mode manager block for the individual cell manager units;
- a wireless communication block containing a wireless transceiver block for allowing the microcontroller block to communicate individual cell information to the overall pack manager unit and to the other individual cell manager units; and
- a charge exchange block.

In still yet another embodiment, the present invention relates to a method of extending the life of a battery pack, the method comprising the steps of: utilizing a battery pack manager according to any embodiment of the present invention to manage the charging and discharging cycles of at least one battery pack.

In still yet another embodiment, the present invention relates to a battery pack manager unit, or a sub-component thereof, as shown and described in the attached Figures.

DETAILED DESCRIPTION OF THE INVENTION

The present invention generally relates to a device and method for the management of a collection of battery cells. In one embodiment, the present invention permits the management of a collection of battery cells composed of an overall battery pack manager unit, individual cell manager units, and wireless communication links between these units. In another embodiment, the present invention relates to a device and method for the management of a collection of battery cells in the field of rechargeable batteries, such as batteries based on lithium-based chemistries, nickel-based chemistries, and lead-acid chemistries. In still another embodiment, the present invention is directed to a method that permits the maximization of battery pack capacity during a charge-discharge cycle and permits the maximization of the total number of charge-discharge cycles.

As used herein, two-way connection means that data can travel in both directions through a connection (i.e., bidirectional), whereas a one-way connection means that data travels in only one direction (i.e., unidirectional). However, it should be noted that in some limited instances a unidirectional, or one-way, connection could carry data in both directions. As such, the term one-way connection as used herein is not limited to solely a connection where data flows only in one direction 100 percent of the time. Rather, data could in some instances flow in the "opposite direction."

As discussed above, the present invention relates, in one embodiment, to a device designed to manage a collection of battery cells comprised of an overall battery pack manager unit, individual cell manager units, and wireless communication links between these units, with application to rechargeable batteries. It should be noted that the present invention can be applied to virtually any type of rechargeable battery and thus is not limited to any one type or chemistry of rechargeable battery. Non-limiting examples of types of rechargeable batteries to which the present invention is applicable to include, but are not limited to, lithium-based chemistries, nickel-based chemistries, and lead-acid chemistries.

Figure 1:
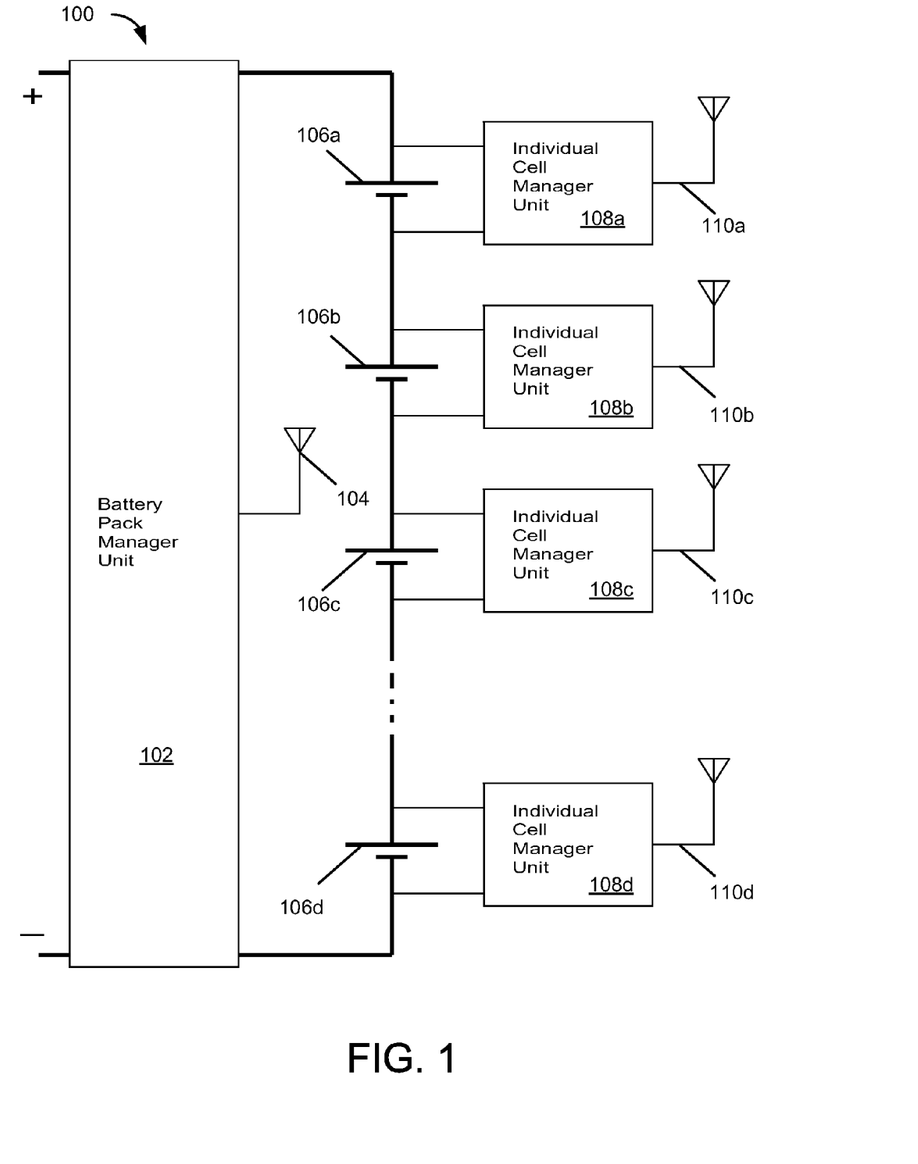
FIG. 1 is a schematic illustration of a device according to one embodiment of the present invention.

Turning to the Figures where like reference numerals represent like components, FIG. 1 is a schematic illustration of a battery management device according to one embodiment of the present invention. The battery management device 100 of FIG. 1 is comprised of a battery pack manager unit 102 that is designed to be wireless due to the inclusion of at least one suitable antenna 104. Although device 100 is shown with four battery cells collectively referred to as 106 (specifically referred to as 106a, 106b, 106c and 106d), it should be noted that the present invention is not limited to any one specific number of battery cells that can be managed by device 100. Rather, device 100 can be designed to manage a battery pack having any suitable number of battery cells including, but not limited to, up to about 10 battery cells, up to about 25 battery cells, up to about 50 battery cells, up to about 100 battery cells, or even about 250 or more battery cells. Here, as well as elsewhere in the specification and claims, individual numerical values or numerical limits can be combined to form non-disclosed ranges.

As can be seen from FIG. 1, each battery cell 106 has a corresponding cell manager unit collectively referred to as 108 (specifically referred to as 108a, 108b, 108c and 108d) connected via on both the positive and negative sides of each battery cell 106. In turn, each cell manager unit 108 has at least one suitably selected wireless antenna collectively referred to as 110 (specifically referred to as 110a, 110b, 110c and 110d). Given the set up of device 100 shown in FIG. 1, device 100 can monitor and specifically control the charging and recharging of each battery cell 106 individually, in any desired combination, or collectively as is desired via battery pack manager unit 102 or each individual cell manager unit 108. A wide variety of parameters and/or performance criteria can be monitored and/or controlled via the device illustrated in FIG. 1. Such battery pack or cell parameters or performance criteria include, but are not limited to, current output, voltage output, charge or discharge state, peak voltage, peak current, battery pack or cell temperature, cell damage rates, or any combination of two or more thereof.

In another embodiment, device 100 of FIG. 1 can be designed to be wirelessly monitored and controlled via a suitable interface designed to access and communicate via the World Wide Web (i.e., the Internet), an intranet, or any other suitable wireless communication network (e.g., a cell phone network, a Wi-Fi network, etc.).

Thus, due to device 100 of FIG. 1, a device is created that is able to specifically permit the wireless control and wireless monitoring of individual cells in a battery pack, as well as providing the wireless control and wireless monitoring of a battery pack.

Figure 2:
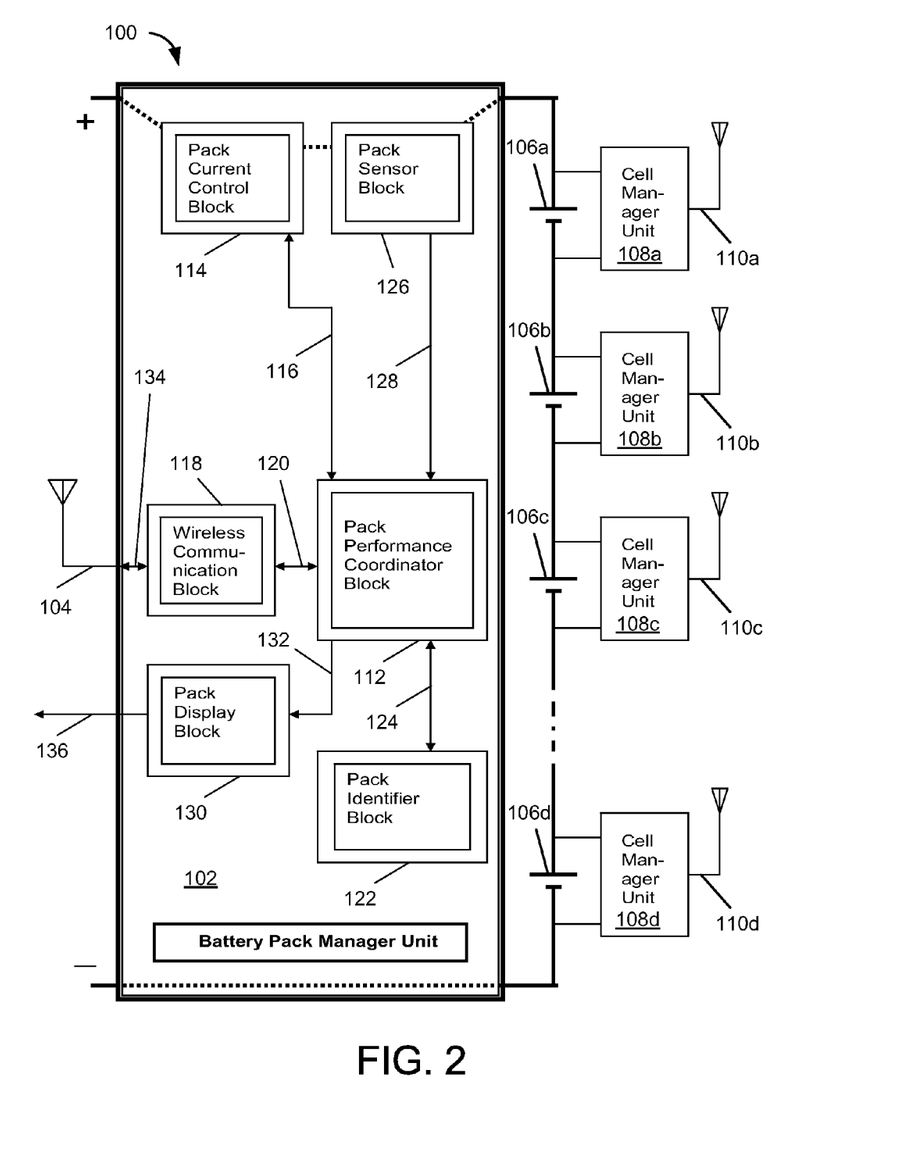
FIG. 2 is a schematic illustration of the device of FIG. 1 having a battery pack manager unit according to one embodiment of the present invention.

Turning to FIG. 2, is a schematic illustration is shown of a battery management device according to FIG. 1. FIG. 2 contains a detailed schematic of battery pack manager unit 102 of FIG. 1. Regarding battery pack management unit 102 of device 100 as illustrated in FIG. 2, in one embodiment battery pack management unit 102 is comprised of a pack performance coordinator block 112 that is in communication with: (i) a pack current control block 114 via a two-way connection 116; (ii) a wireless communication block 118 via a two-way connection 120; and (iii) a pack identifier block 122 via a two-way connection 124. Additionally, pack performance coordinator block 112 is in communication with a pack sensor block 126 via input only communication line 128 to pack performance coordinator block 112. Furthermore, pack performance coordinator block 112 is in communication with a pack display block 130 via an output only communication line 132. Wireless communication block 118 is also in two-way communication with antenna 104 via two-way connection 134, and pack display block 130 has a display output communication connection 136 that permits the display of various information on a suitable selected display device. Suitable display devices include, but are not limited to, a computer, a LCD monitor, a CRT monitor, a touchscreen display device, etc. Additionally, as can be seen in FIG. 2, pack current control block 114 and pack sensor block 126 are connected together and are in communication with the positive end of a series of battery cells 106.

Figure 3:
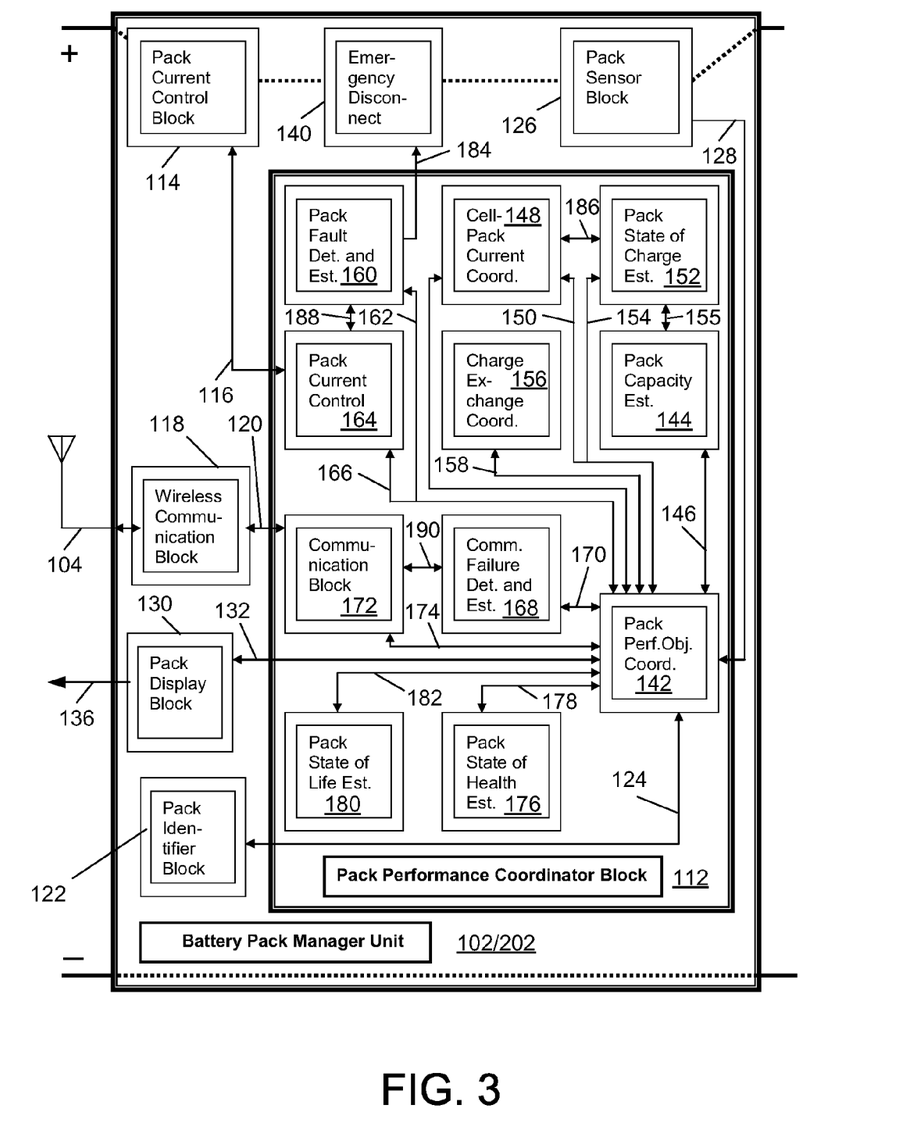
FIG. 3 is a schematic illustration of a battery pack manager unit according to another embodiment of the present invention, where the battery pack manager unit of FIG. 3 has a pack performance coordinator block according to one embodiment of the present invention.

FIG. 3 is a schematic illustration of a battery pack manager unit 202 that can be utilized in conjunction with device 100 of FIG. 1. The main difference between battery pack manager unit 202 and battery pack manager unit 102 is that unit 202 includes an emergency disconnect control block 140 that is positioned between pack current control block 114 and pack sensor block 126. Emergency disconnect control block 140 is in communication with pack performance block coordinator block 112 as will be described below. FIG. 3 also illustrates one possible design for pack performance coordinator block 112. It should be understood that the design of pack performance coordinator block 112 disclosed in FIG. 3 can be utilized in conjunction with device 100 of FIGS. 1 and 2. Also, in the case where emergency disconnect control block 140 is present in the battery pack manager unit of the present invention, this set-up is considered to be just one possible alternative embodiment of the present invention.

Regarding the overall schematic design of FIG. 3, a discussion of the design of FIG. 3, apart from the design of pack performance coordinator block 112, will not be undertaken for the sake of brevity as the design of FIG. 3 is identical to that of FIG. 2, except as noted above.

As can be seen from FIG. 3, pack performance coordinator block 112 is comprised of a pack performance objective coordinator block 142 that is in communication with: (a) a pack capacity estimator block 144 via a two-way connection 146; (b) a cell pack current coordinator block 148 via a two-way connection 150; (c) a pack state of charge estimator block 152 via a two-way connection 154; (d) a charge exchange coordinator block 156 via a two-way connection 158; (e) a pack fault detection and estimator block 160 via a two-way connection 162; (f) a pack current control block 164 via a two-way connection 166; (g) a communication failure detection and estimator block 168 via a two-way connection 170; (h) a communication block 172 via a two-way connection 174; a pack state of health estimator block 176 via a two-way connection 178; and (i) a pack state of life estimator block 180 via a two-way connection 182. Pack performance objective coordinator block 142 is also connected via a one-way connection 132 to pack display block 130, communication block 172 is also connected to wireless communication block 118 via a two-way connection 120, pack current control block 164 is also connected to pack current control block 114 via a two-way connection 116 and to emergency disconnect block 140 via a one-way connection 184, cell pack current coordinator 148 is also connected via a two-way connection 186 to pack state of charge estimator block 152, pack fault detection and estimator block 160 is also connected via a two-way connection 188 to pack current control block 164, and communication failure detection and estimator block 168 is also connected via a two-way connection 190 to communication block 172. Additionally, cell pack current coordinator block 148 is connected via a two-way connection 155 to pack capacity estimator block 144.

In an alternative embodiment, where the display device also permits data entry (e.g., a touchscreen display device), the connection between pack performance coordinator block 112 and pack display block 130 could be a two-way connection. The same also applies to any connection between pack display block 130 and any suitable display or display/input device.

Additionally, as can be seen in FIG. 3, pack current control block 114, emergency disconnect block 140 and pack sensor block 126 are connected together and are in communication with the positive end of a series of battery cells 106 (not shown).

Figure 4:
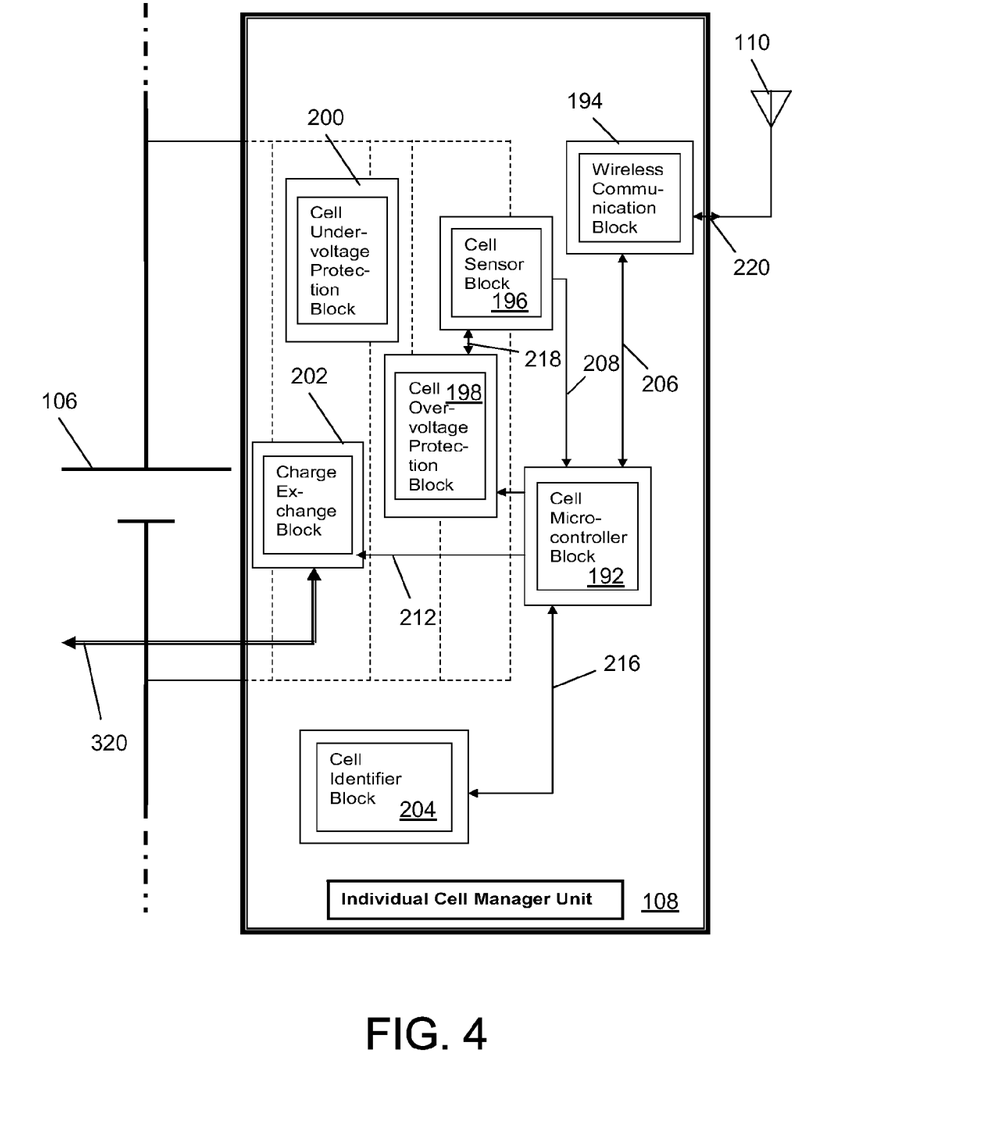
FIG. 4 is a schematic illustration of an individual cell manager unit in accordance with one embodiment of the present invention that can be used in conjunction with the device of FIG. 1.

FIG. 4 is a schematic illustration of an individual cell manager unit 108 that can be utilized in conjunction with device 100 of FIG. 1. As can be seen from FIG. 4, individual cell manager unit 108 is comprised of: (A) a cell microcontroller block 192; (B) a wireless communication block 194; (C) a cell sensor block 196; (D) a cell over-voltage protection block 198; (E) a cell under-voltage protection block 200; (F) a charge exchange block 202; and (G) a cell identifier block 204. These blocks are connected to a respective battery cell 106 as shown by the dashed connections in FIG. 4. Additionally, cell micro-controller block 192 is connected to: wireless communication block 194 via a two-way connection 206; cell sensor block 196 via a one-way connection 208; cell over-voltage protection block 198 via a one-way connection 210; charge exchange block 202 via a one-way connection 212; and cell identifier block via a two-way connection 216. Cell sensor block 196 is also connected via a two-way connection 218 to cell over-voltage protection block 198. Furthermore, wireless communication block 194 is connected via a two way connection 220 to antenna 110.

Figure 5:
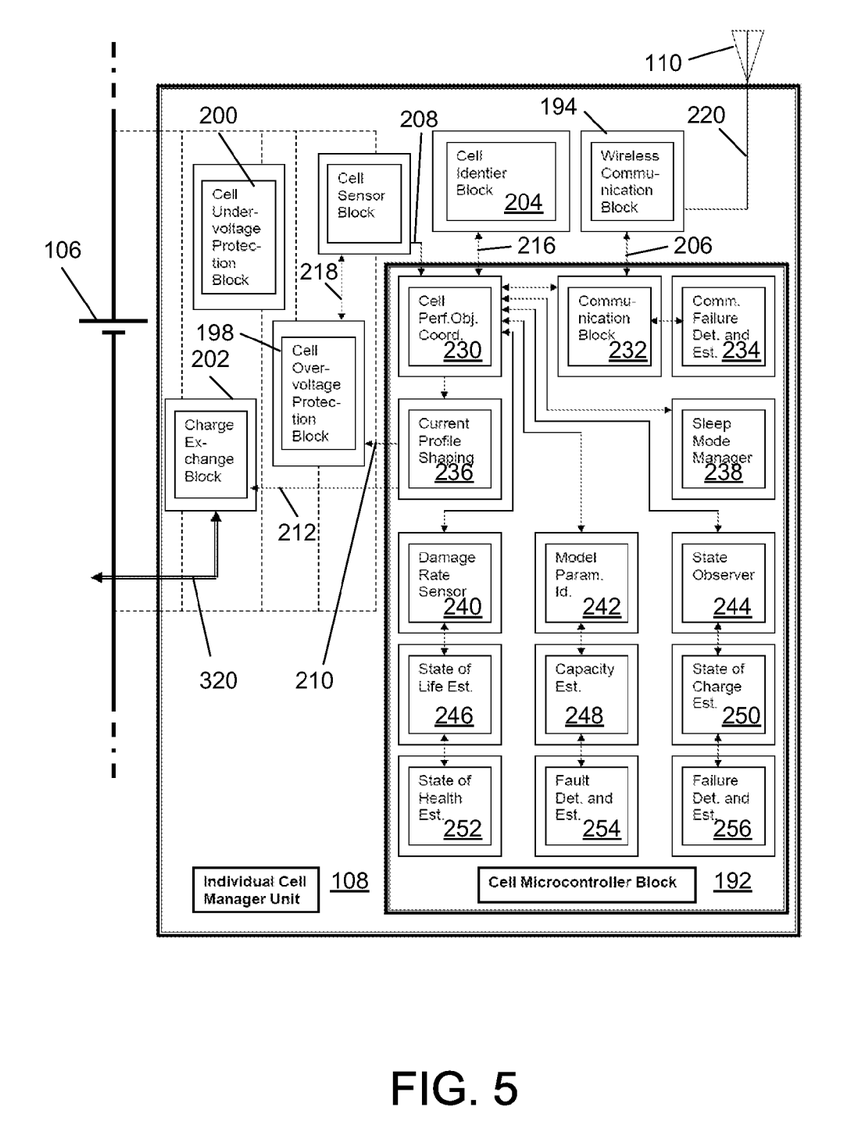
FIG. 5 is a schematic illustration of an individual cell manager unit in accordance with one embodiment of the present invention that can be used in conjunction with the device of FIG. 1.

Turning to FIG. 5, a schematic illustration is shown of an individual cell manager unit in accordance with one embodiment of the present invention that can be used in conjunction with the device of FIG. 1. Since FIG. 5 is a more detailed schematic of FIG. 4, the portion of FIG. 5 outside of the detailed structure of the cell micro-controller block 192 is omitted for the sake of brevity.

Regarding cell micro-controller block 192, cell micro-controller block 192 is comprised of: (I) a cell performance objective coordinator block 230; (II) a communication block 232; (III) a communication failure detection and estimator block 234; (IV) a current profile shaping block 236; (V) a sleep mode manager block 238; (VI) a damage rate sensor block 240; (VII) a model parameter identification block 242; (VIII) a state observer block 244; (IX) a state of life estimator block 246; (X) a capacity estimator block 248; (XI) a state of charge estimator block 250; (XII) a state of health estimator block 252; (XIII) a fault detection and estimator block 254; and (XIV) a failure detection and estimator block 256. These components of cell micro-controller block 192 are connected via various one-way connections (denoted by one-way arrows), or two-way connections (denoted by two-way arrows), as shown in FIG. 5.

Regarding arrow 320 in FIGS. 4 and 5, this arrow represents the fact that a device in accordance with one embodiment of the present invention can permit, enable or control the charge exchanged between all, or even just a portion of, the different cells in a battery pack. This is advantageous in that it permits the device of the present invention to equalize the charge in different battery cells in a battery pack without the loss and waste of much energy.

Of additional interest is U.S. Pat. No. 7,489,107 which discloses a system and method for charging and thus extending the life of an electrical storage device. The entirety of this patent application is incorporated by reference in its entirety as if reproduced herein.

Given the above, in another embodiment a device in accordance with the present invention is an overall battery pack manager unit comprising:

a pack identifier block 122;
a pack sensor block 126 that comprises pack current sensors, pack voltage sensors and pack temperature sensors;
a pack current control block 114 that comprises a block that uses signals from a pack performance coordinator block 112 to control the pack current;
a pack informational display block 130 that displays one or more of a pack voltage, a pack current, a pack temperature, a pack state-of-charge, a pack state-of-life, a pack state-of-health, or individual cell information, where the individual cell information includes one or more of a cell voltage, a cell current, a cell temperature, cell model parameters, cell damage rates, a cell state-of-charge, a cell state-of-life, a cell state-of-health, cell faults or cell manager unit failures.
a pack performance coordinator block 112 which has the ability to change the pack charging or discharging current to coordinate with the individual cells so as to achieve specific performance objectives, such as minimizing individual cell damage rates, minimizing charging time, or maximizing the energy out of the pack; the parameters of which are highly dependent on cell chemistry, where pack performance coordinator block 112 comprises:
a pack current control block 164;
a cell-pack-current coordination block 148, wherein this block coordinates pack charging currents with cell bypass currents. In one embodiment, the pack charging current must be reduced to prevent damage to fully charged cells in full bypass, while the remaining cells finish charging. The pack voltage, the cell voltages, the bypass currents, and the charging current used in coordination are highly dependent on pack chemistry and pack capacity and thus the present invention is not limited to any one set of values/parameters. Rather, such parameters will vary depending upon the battery chemistry in question;
a pack performance objective coordinator block 142;
a real-time pack capacity estimator block 144;
a real-time pack state-of-charge estimator block 152;
a real-time pack state-of-life estimator block 180;
a real-time pack state-of-health estimator block 176;
a real-time charge-exchange coordinator block 156;
a communication block 172;
a communication failure detection and estimator block 168 that is designed to accommodate and coordinate; and
a pack fault detection and estimator block 160 in combination with an emergency disconnect block 140; and
a wireless communication block 118 including a wireless link with every individual cell manager unit; a wireless link with any load control unit, such as a vehicle controller; a wireless link with any battery charging unit, such as a power supply; and a wireless link with the Internet for remote monitoring.

Given the above, in another embodiment an individual cell manager unit in accordance with the present invention comprises:

a cell and pack identifier block 204 that is a unit for assigning an identification code to each individual cell manager unit and recognizing the overall battery pack unit identification code;
a cell sensor block 196 including one or more of cell current sensors, cell voltage sensors, cell temperature sensors, or cell bypass current sensors;
a cell overvoltage protection block 198 including a pseudo-passive overvoltage protection unit to accommodate failures in the microcontroller block;
a cell under-voltage protection block 200 having a passive unit to accommodate cell failures and microcontroller block failures during discharge;
a cell microcontroller block 192 comprising:
a performance objective coordinator block 230;
a real-time cell model parameter identification block 242;
a real-time cell capacity estimator block 248;
a real-time cell state observer block 244 for estimating cell dynamic variables;
a real-time state-of-charge estimator block 250;
a real-time damage rate sensor block 240;
a real-time state-of-life estimator block 246;
a real-time state-of-health estimator block 252;
a real-time cell fault detection and estimator block 254;
a real-time component failure detection and estimator block 256;

a real-time cell life-extending charging-current-profile shaping block 236;
a communication block 232;
a real-time wireless communication failure detection and estimator block 234; and
a sleep-mode manager block 238 for the individual cell manager units;
a wireless communication block 194 containing a wireless transceiver block for allowing the microcontroller block to communicate individual cell information to the overall pack manager unit and to the other individual cell manager units; and
a charge exchange block 202 including a collection of magnetic cores into which individual cell control units can place energy from their specific cells, and from which individual cell control units can extract energy to be placed into their specific cells, the process of the exchange being wirelessly coordinated by the overall pack manager unit, and requiring local microcontroller block control of individual cell manager unit switches to control the exchange of energy with the magnetic cores.

In still another embodiment, the present invention relates to a back pack manager as shown and described in the attached Figures.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A battery pack manager for charging a battery pack comprising a plurality of battery cells using a power source, the battery pack manager comprising:
   a battery pack manager unit coupled to the battery pack, and directly coupled to an output of the power source, said battery pack manager unit comprising:
   a wireless communication block that includes a first antenna that establishes a wireless link with a plurality of second antennas, such that every one of a plurality of individual cell manager units includes one said second antenna, each said individual cell manager unit adapted to be coupled to one of the plurality of battery cells of the pack, and the battery pack manager is able to permit the wireless control and wireless monitoring of individual cells in a battery pack through each said individual cell manager unit,
   wherein each said individual cell manager unit comprises a charge exchange block that includes a collection of magnetic cores from which individual cell control units place energy from their specific cells, and from which individual cell control units can extract energy to be placed into their specific cells, the process of the exchange being wirelessly coordinated by said battery pack manager unit.

2. The battery pack manager of claim 1, wherein the battery pack manager unit is designed to manage battery cells having lithium-based chemistries, nickel-based chemistries, and lead-acid chemistries.

3. The battery pack manager of claim 2, wherein the battery pack manager unit is designed to manage battery cells having lithium-based chemistries.

4. The battery pack manager of claim 2, wherein the battery pack manager unit is designed to manage battery cells having nickel-based chemistries.

5. The battery pack manager of claim 1, wherein the battery pack manager unit further comprises at least one individual cell manager unit comprising:
   a cell and pack identifier block that is a unit for assigning an identification code to each individual cell manager unit and recognizing the overall battery pack unit identification code;
   a cell sensor block including one or more of cell current sensors, cell voltage sensors, cell temperature sensors, or cell bypass current sensors;
   a cell overvoltage protection block including a pseudo-passive overvoltage protection unit to accommodate failures in the microcontroller block;
   a cell under-voltage protection block having a passive unit to accommodate cell failures and microcontroller block failures during discharge;
   a cell microcontroller block comprising:
      a performance objective coordinator block;
      a real-time cell model parameter identification block;
      a real-time cell capacity estimator block;
      a real-time cell state observer block for estimating cell dynamic variables;
      a real-time state-of-charge estimator block;
      a real-time damage rate sensor block;
      a real-time state-of-life estimator block;
      a real-time state-of-health estimator block;
      a real-time cell fault detection and estimator block;
      a real-time component failure detection and estimator block;
      a real-time cell life-extending charging-current-profile shaping block;
      a communication block;
      a real-time wireless communication failure detection and estimator block; and
      a sleep-mode manager block for the individual cell manager units;
   a wireless communication block containing a wireless transceiver block for allowing the microcontroller block to communicate individual battery cell information to the overall pack manager unit and to the other individual cell manager units; and
   a charge exchange block.

6. The battery pack manager of claim 5, wherein the battery pack manager unit is designed to manage battery cells having lithium-based chemistries, nickel-based chemistries, and lead-acid chemistries.

7. The battery pack manager of claim 6, wherein the battery pack manager unit is designed to manage battery cells having lithium-based chemistries.

8. The battery pack manager of claim 6, wherein the battery pack manager unit is designed to manage battery cells having nickel-based chemistries.

9. The battery pack manager of claim 6, wherein the battery pack manager unit is designed to manage battery cells having lead-acid chemistries.

10. A method of extending the life of a battery pack of a plurality of battery cells, the method comprising the steps of:
    utilizing a battery pack manager according to claim 1 to manage the charging and discharging cycles of the battery pack.

11. The battery pack manager of claim 1, wherein said pack fault detection and estimator block are in combination with an emergency disconnect block.

12. The battery pack manager of claim 1, wherein said wireless communication block includes a wireless link with any load control unit.

13. The battery pack manager of claim 1, wherein said wireless communication block includes a wireless link with any battery charging unit.

14. A battery pack manager for charging a battery pack comprising a plurality of individual battery cells using a power source, the battery pack manager comprising:
a battery pack manager unit coupled to the entire battery pack, and coupled to an output of the power source, wherein said battery pack manager unit monitors at least one electrical parameter associated with the entire battery pack, said battery pack manager unit configured to deliver an electrical charging current to the battery pack, and wherein said battery pack manager unit includes a first antenna; and the battery pack manager is able to permit the wireless control and wireless monitoring of individual cells in a battery pack through each said individual cell manager unit,
a plurality of individual cell manager units, each said individual cell manager unit in operative communication with one of the plurality of individual battery cells of the battery pack to monitor at least one electrical parameter associated with the battery cells, each said individual cell manager unit having a second antenna to communicate wirelessly with said first antenna of said battery pack manager unit, wherein said plurality of individual cell manager units each include a charge exchange block that includes a collection of magnetic cores from which individual cell control unit place energy from their specific cells, and from which individual cell control units can extract energy to be placed into their specific cells, the process of the exchange being wirelessly coordinated by said pack manager unit.

15. The battery pack manager of claim 14, wherein said battery pack manager unit is configured to adjust the electrical current supplied to the battery pack based on said at least one electrical parameter monitored by each said cell manager unit.

16. The battery pack manager of claim 15, wherein said battery pack manager controls one or more of said cell manager units to charge or discharge one or more of the battery cells.

17. The battery pack manager of claim 1, wherein said battery pack manager unit further comprises:
a pack identifier block;
a pack sensor block that comprises pack current sensors, pack voltage sensors and pack temperature sensors;
a pack current control block that comprises a block that uses signals from a pack performance coordinator block to control the pack current;
a pack informational display block that displays one or more of a pack voltage, a pack current, a pack temperature, a pack state-of-charge, a pack state-of-life, a pack state-of-health, or individual cell information, where the individual cell information includes one or more of a cell voltage, a cell current, a cell temperature, cell model parameters, cell damage rates, a cell state-of-charge, a cell state-of-life, a cell state-of-health, cell faults or cell manager unit failures; and
a pack performance coordinator block which has the ability to change the pack charging or discharging current to coordinate with the individual battery cells so as to achieve specific performance objectives, such as minimizing individual battery cell damage rates, minimizing charging time, or maximizing the energy out of the pack; the parameters of which are highly dependent on cell chemistry.

18. The battery pack manager of claim 17, wherein said where pack performance coordinator block comprises:
a pack current control block;
a cell-pack-current coordination block, wherein this block coordinates pack charging currents with cell bypass currents;
a pack performance objective coordinator block;
a real-time pack capacity estimator block;
a real-time pack state-of-charge estimator block;
a real-time pack state-of-life estimator block;
a real-time pack state-of-health estimator block;
a real-time charge-exchange coordinator block;
a communication block;
a communication failure detection and estimator block that is designed to accommodate and coordinate; and
a pack fault detection and estimator block.

19. The battery pack manager of claim 1, wherein said plurality of individual cell manager units each includes:
a performance objective coordinator block;
a real-time cell model parameter identification block;
a real-time cell capacity estimator block;
a real-time cell state observer block for estimating cell dynamic variables;
a real-time state-of-charge estimator block;
a real-time damage rate sensor block;
a real-time state-of-life estimator block;
a real-time state-of health estimator block;
a real-time cell fault detection and estimator block;
a real-time component failure detection and estimator block;
a real-time cell life-extending charging-current-profile shaping block;
a communication block;
a real-time wireless communication failure detection and estimator block; and
a sleep-mode manager block.

20. The battery pack manager of claim 14, wherein said plurality of individual cell manager units each include:
a performance objective coordinator block;
a real-time cell model parameter identification block;
a real-time cell capacity estimator block;
a real-time cell state observer block for estimating cell dynamic variables;
a real-time state-of-charge estimator block;
a real-time damage rate sensor block;
a real-time state-of-life estimator block;
a real-time state-of health estimator block;
a real-time cell fault detection and estimator block;
a real-time component failure detection and estimator block;
a real-time cell life-extending charging-current-profile shaping block;
a communication block;
a real-time wireless communication failure detection and estimator block; and
a sleep-mode manager block;
wherein based on said at least one electrical parameter of said battery pack and said at least one electrical parameter of each battery cell, said battery pack manager unit commands one or more of said individual cell manager units to control at least one function thereof.

* * * * *